United States Patent
Mashayekhi

Patent Number: 5,818,936
Date of Patent: Oct. 6, 1998

[54] SYSTEM AND METHOD FOR AUTOMICALLY AUTHENTICATING A USER IN A DISTRIBUTED NETWORK SYSTEM

[75] Inventor: Cameron Mashayekhi, Provo, Utah

[73] Assignee: Novell, Inc., Orem, Utah

[21] Appl. No.: 617,940

[22] Filed: Mar. 15, 1996

[51] Int. Cl.⁶ .............................. H04K 1/00; G06F 12/14
[52] U.S. Cl. ................................ 380/25; 380/4; 380/49; 395/188.01
[58] Field of Search .................................. 380/4, 23, 24, 380/25, 49; 395/188.01

[56] References Cited

U.S. PATENT DOCUMENTS

| | | | |
|---|---|---|---|
| 5,073,933 | 12/1991 | Rosenthal | 380/25 |
| 5,349,642 | 9/1994 | Kingdon | 380/25 |
| 5,594,921 | 1/1997 | Pettus | 380/25 |
| 5,606,614 | 2/1997 | Brady et al. | 380/23 |
| 5,625,793 | 4/1997 | Priem et al. | 380/4 |

OTHER PUBLICATIONS

Netscape 2, Special Ed.; Que Corp.; Indianapolis, IN, Sep. 1, 1995.
Prc, Aps–Tr–Trg–00–06.03; Manual of the Automated Patent System, Sep. 1988.
Prc, Aps–Tr–Trg–00–06.09; Manual of the Automated Patent System, May 29, 1990.

*Primary Examiner*—Stephen C. Buczinski
*Attorney, Agent, or Firm*—Cesari and McKenna, LLP

[57] ABSTRACT

A distributed authentication service that automates an authentication exchange between a user and an application program of a distributed network system. The novel distributed authentication service comprises an exchange controller coupled to an authentication database containing a group of encrypted application secrets associated with the user. Each application secret is, in turn, associated with a particular program resident in the system. According to the present invention, the controller cooperates with the database to automate the exchange procedure by (i) receiving an authentication inquiry generated by the particular program in response to the user's request to access that program and (ii) providing that program with the proper application secret retrieved from the database. The group of encrypted application secrets associated with the user is referred to as a "keychain." Each keychain is assigned a public/private key pair, with all secrets in the keychain being encrypted with the public key. The user may be associated with one or more keychains, each of which may be further associated with different secrets. Since these secrets correspond to application programs, the association of programs to keychains may be based upon various characteristics, such as the user's rights with respect to the programs. Furthermore, each application program may be accessible by the same or different users so that, e.g., those users having the same access rights for a program may utilize the same keychain containing each user's secrets for the programs.

20 Claims, 6 Drawing Sheets

SYSTEM AND METHOD FOR AUTOMICALLY AUTHENTICATING A USER IN A DISTRIBUTED NETWORK SYSTEM

FIELD OF THE INVENTION

The present invention relates generally to public key cryptography in distributed data processing systems and more specifically, to a means for transparently authenticating a user to multiple services and applications in a distributed system.

BACKGROUND OF THE INVENTION

In a distributed data processing network system, the methodology employed to reliably verify the identity of a communicating device across the network prior to allowing the device to access system operations and resources is referred to as authentication. Access to the system may be, for example, for the purpose of communicating with other users, retrieving secure information, or receiving a service. Distributed systems generally include various computer nodes interconnected by a communications medium. The computer nodes may include nodes that are directly accessed by users, e.g., workstations, and nodes running specialized applications, e.g., servers. These nodes, the processes running on these nodes, and the users of the distributed system are referred to as "principals." The authentication exchange is performed on behalf of the principals.

Public key cryptography is a method of secure communication in which each principal has a public encryption key and a private encryption key, and two principals can communicate knowing only each other's public keys. An encryption key is a code or number which, when taken together with an encryption algorithm, defines a unique transformation used to encrypt or decrypt data. A public key system may be used in such a way as to ensure confidentiality of the information being transmitted, i.e., to ensure that the information may not be understood by an eavesdropper, as well as to ensure the authenticity of the sender of the information.

The manner in which a public key cryptography system operates to ensure authentication may be understood without reference to the mathematical transformations that are used for encryption and decryption. Public key cryptography is also referred to as a "asymmetric" encryption because information encoded with a public key may be decoded only by using a complementary private key, the associated public and private keys defining a key pair. According to this type of encryption, the private key is known only to the owner of the key, while the public key is known to other principals in the system.

Accordingly, to effect a secure transmission of information to a recipient, a principal encodes ("encrypts") the information with the recipient's public key. Since only the intended recipient has the complementary private key, only that principal can decode ("decrypt") it. On the other hand, to prove to a recipient of information that the sender is who he purports to be, the sender encodes ("signs") the information with its private key. If the recipient can decode ("verify") the information, it knows that the sender has correctly identified itself. In public key cryptography, each principal is responsible for knowing its own private key and all the public keys are generally accessible from one location, typically a directory service.

Operation of a public key cryptography system will now be described with reference to an illustrative log in authentication exchange between a work station, acting on behalf of a user, and a remote server. Basically, the workstation encrypts a message for confidentiality by performing a transformation using the server's public key, and a server decrypts the message by performing a transformation using its private key.

Specifically, a user logs into the workstation with the user's password and the workstation derives a secret, non-complimentary, encryption key by applying a known hash algorithm to the password. The workstation then requests the user's private key from a directory service (DS) of the remote server. The user's private key has previously been encrypted under the same secret encryption key and stored as a "credential" of the directory. A credential is a table entry comprising the user's name and the user's private key; in other words the credential is a representation of the user in the computer. The remote server returns the encrypted private key to the workstation, which uses the secret key to encrypt and obtain the private key.

Once the user is authenticated by the directory services on the network, and is then given access to the network, the user attempts to access either network-based services or applications. For example, the user may attempt to log into a different network or access a different operating system (e.g., accessing a DCE-based Unix server) or access applications such as Lotus Notes or Novell GroupWise. Generally, each of these entities includes a component referred to as an authentication agent that maintains the user's identity (ID) and secrets (e.g., passwords). Although the user has been authenticated on the network, authentication agents generally are not aware of the network authentication, and thus query the user for its password. This can consume considerable bandwidth and can be quite intrusive to the user, particularly in systems requiring users to be authenticated whenever a resource is accessed.

Some conventional systems attempt to reduce the number of authentications a user must perform. For example, the Macintosh operating system, available from Apple Computer, Inc., provides what is referred to as a "keychain." Here, the operating system enables a user to manually enter all of its passwords on a single keychain that resides within the operating system. A keychain password is then used by the user to gain access and run all of the network services at the time the workstation is booted.

One drawback to this approach is that there is only one keychain per operating system (i.e., per workstation), thereby limiting the availability of a user's keychain to solely the single workstation. In other words, the localized nature of the keychain prevents the user from utilizing other workstations or systems throughout the distributed network system. Additionally, the use of a single keychain provides a single level of access control to all application programs in the system for a given workstation; that is, different access rights cannot be associated with different programs for a user.

Another drawback to the "Macintosh" Keychain approach is that it only stores user names and passwords for network-based services, as opposed to application programs. That is, although single password access is provided to all services, a user must continue to authenticate itself to each program that is accessed.

An alternate approach to reducing the number of authentications performed by a user is provided by the Windows 95 (Win95) operating system available from Microsoft Corporation. Win95 provides a method of allowing users to enter only one password (at start-up time) when logging into the network. A drawback of this approach is that, like the Macintosh keychain technique, the service is only available on each local workstation as part of its operating system, and is not available on the network in a distributed form.

More troubling, however, is that the service does not allow passwords of choice for application programs or network logins, thus requiring all services accessed by the workstation to synchronize their passwords with the Win95 password for that platform. Security concerns arise when a user assigns the same value to all of its passwords. Under such circumstances, the user's rights to all applications, rather than to just a single system, are given away if the password is compromised. This may further compromise portions of the network system as well as the confidentiality of the user's information.

It can thus be seen from the foregoing that each of the conventional approaches to simplifying the authentication process have limited capabilities and flexibility. What is needed, therefore, is a means for easily and efficiently authenticating a user to various application programs or systems in a distributed network without compromising the security of the network or the confidentiality of the users' information.

SUMMARY OF THE INVENTION

The present invention relates to a distributed authentication service that automates an authentication exchange between a user and an application program of a distributed network system. The novel distributed authentication service comprises an exchange controller coupled to an authentication database containing a group of encrypted application secrets associated with the user. Each application secret is, in turn, associated with a particular program resident in the system. According to the present invention, the controller cooperates with the database to automate the exchange procedure by (i) receiving an authentication inquiry generated by the particular program in response to the user's request to access that program and (ii) providing that program with the proper application secret retrieved from the database.

The group of encrypted application secrets associated with the user is referred to as a "keychain." Each keychain is assigned a public/private key pair, with all secrets in the keychain being encrypted with the public key. The user may be associated with one or more keychains, each of which may be further associated with different secrets. Since these secrets correspond to application programs, the association of programs to keychains may be based upon various characteristics, such as the user's rights with respect to the programs. Furthermore, each application program may be accessible by the same or different users so that, e.g., those users having the same access rights for a program may utilize the same keychain containing each user's secrets for the programs.

In the illustrative embodiment, the exchange controller comprises an application program interface (API) that is distributed among user workstations (i.e., workstation APIs) and the authentication database (i.e., the database API) ; preferably, both the database API and authentication database reside in a network directory services (NDS) system. When the authentication inquiry is received from the program at the controller, the workstation API verifies that the user is a valid network client (i.e., has successfully logged-on and has been authenticated to the NDS) by requesting the proper application secret for that particular program. In response to this request, the database API accesses the authentication database and provides the workstation with an encrypted application secret along with the private key for decrypting that secret. The workstation API then decrypts and forwards the proper secret (and user identity) to the particular application program.

Advantageously, authentication of a valid network client is performed automatically by the distributed authentication service for all desired local or network-based applications in the user's associated keychains. That is, authentication is performed transparently (without any further user intervention) and without degradation of network security. Thus, a valid network client does not have to authenticate itself each time it attempts to access an application program.

Furthermore, the distributed nature of the authentication service provides the user with access to application programs from any connected workstation in the distributed network. In other words, the inventive service is available throughout the entire network rather than being localized on an individual workstation. The authentication service is also available to all applications and services alike, and is not limited to network-based applications.

The flexible association of users, keychains and application secrets enables each user to have its own unique user identity and application secret for every application on the network. Thus, knowledge of one application secret does not compromise the security of all remaining application secrets associated with the user.

Further features and advantages of the present invention as well as the structure and operation of various embodiments of the present invention are described in detail below with reference to the accompanying drawings. In the drawings, like reference numbers indicate identical or functionally similar elements. Additionally, the left-most digit of a reference number identifies the drawing in which the reference number first appears.

BRIEF DESCRIPTION OF THE DRAWINGS

For a fuller understanding of the nature of the invention, reference should be made to the following detailed description taken in connection with the accompanying drawings, in which.

DETAILED DESCRIPTION OF THE PREFERRED EMBODIMENTS

Figure 1:
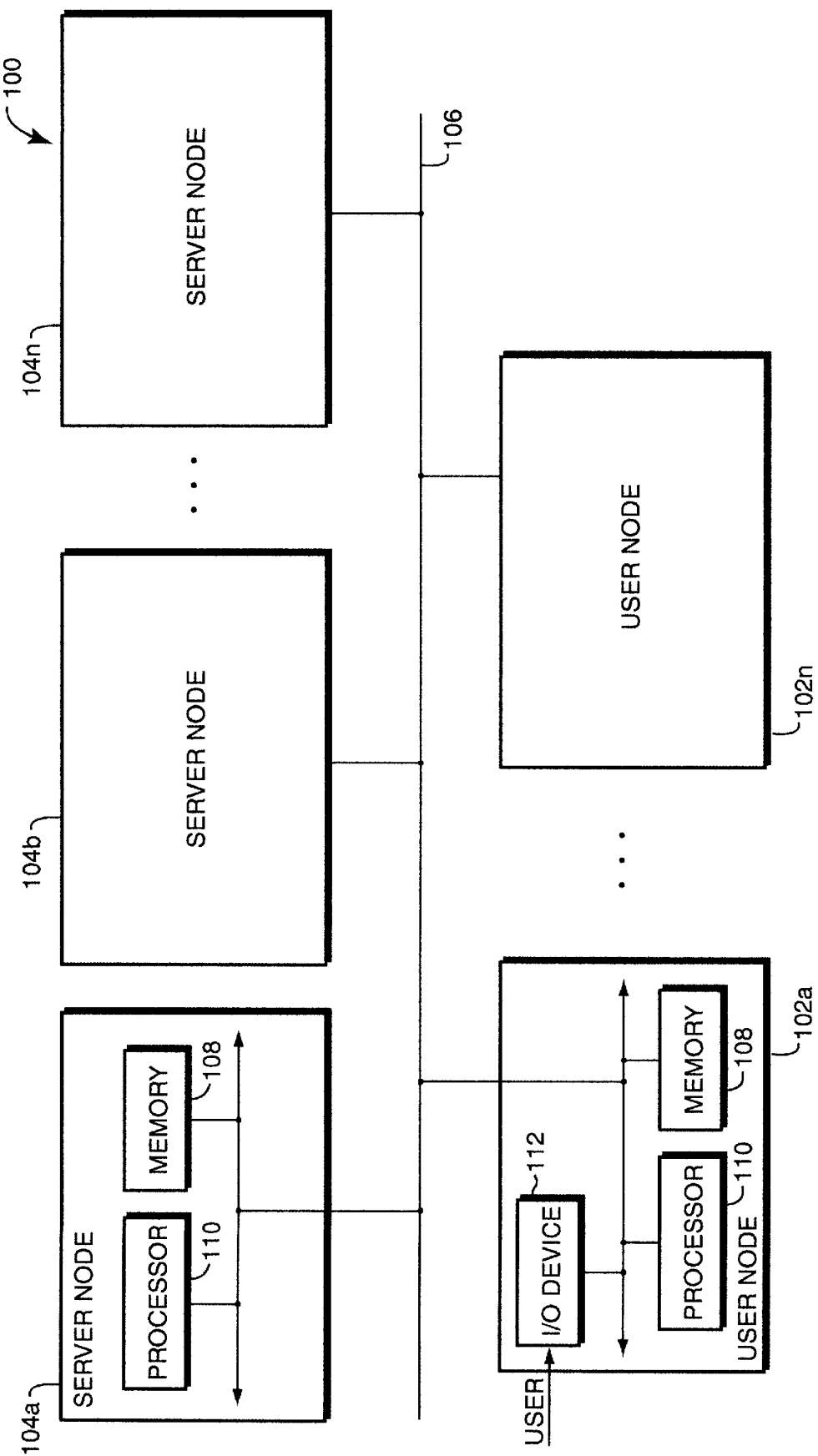
FIG. 1 is a diagram of a distributed data processing network system in which the apparatus and protocol of the invention may be used.

Referring to FIG. 1, a distributed data processing network system 100 includes a plurality of computer nodes, such as user nodes 102a–n and various server nodes 104a–n, interconnected by a communications medium 106. The user node, e.g., a workstation 102a, is a computer generally configured for use by one user at a time, whereas each server 104 is a computer resource running specialized software applications and services, typically for use by many users. In general, each of the computer nodes includes memory means 108 for storing software programs and data structures associated with the cryptographic methods and techniques described herein. In addition, the nodes further include processor means 110 for executing the software programs, including various algorithms for generating numbers and codes associated with, e.g., passwords, and for manipulating the stored data structures. It will be apparent to those skilled in the art that other processor and memory means, such as encoding and decoding devices, may be used within the teachings of the invention to implement cryptographic authentication methods and techniques described herein.

To access resources of the network 100, a user typically "logs in" with a server node 104 configured as a directory service (DS) through the local workstation 102a, and then remotely authenticates itself to the DS to acquire access to those resources. Specifically, the user provides an authorized user identity (e.g., a user name) and a user secret (e.g., a password) to an input/output device 112 of the workstation 102a and the workstation authenticates the log-in attempt using a log-in authentication exchange with the DS. Once authenticated, the user receives its private key, which the workstation 102a uses in subsequent authentication exchanges with remote principals, such as server nodes 104. As noted, these subsequent authentication exchanges consume considerable bandwidth and are burdensome to the user when accessing resources that require authentication. The present invention is directed to an arrangement for easily and efficiently authenticating a user to various application programs or systems in a distributed network without compromising the security of the network or the confidentiality of the user's information.

Figure 2:
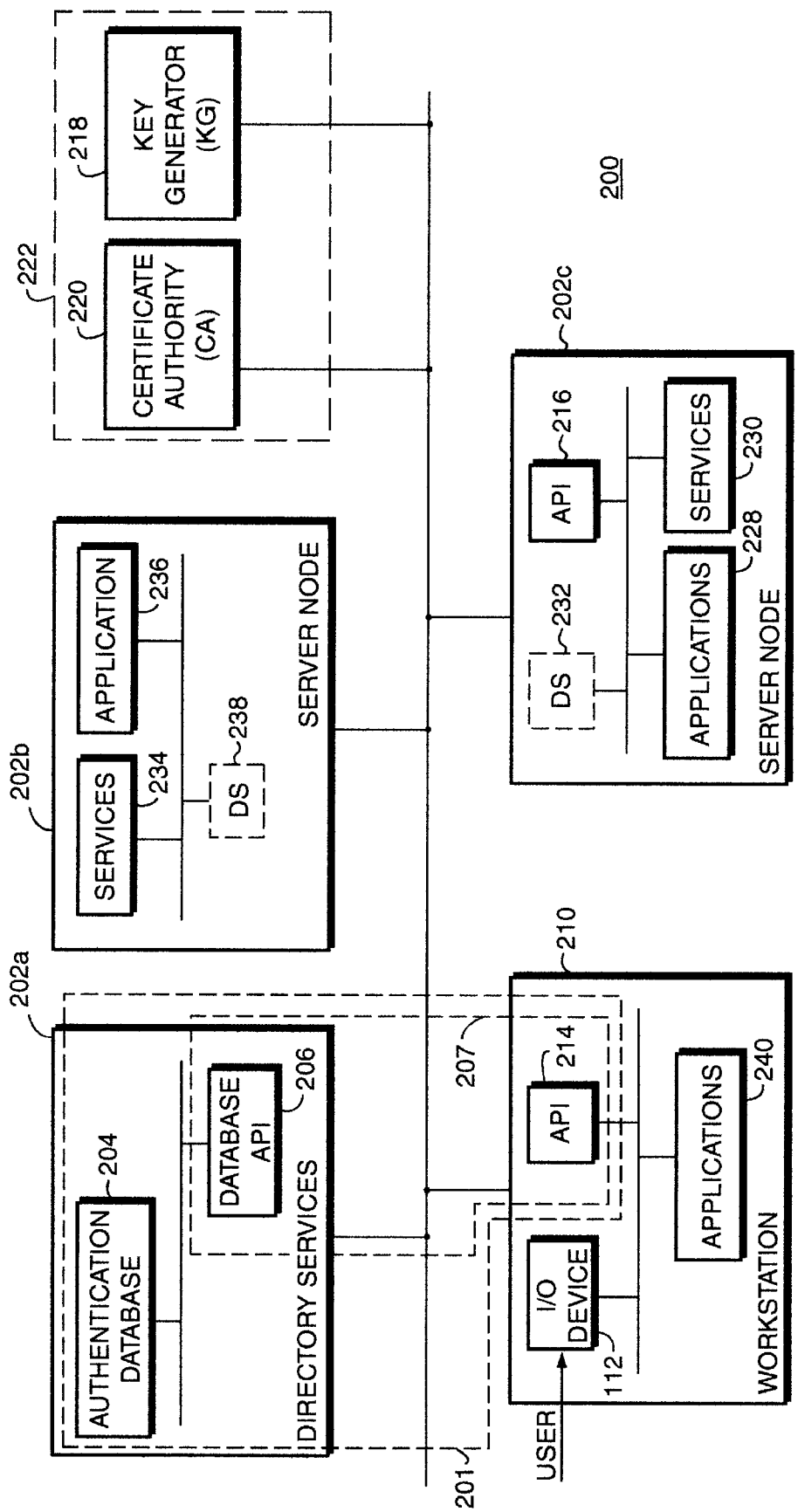
FIG. 2 is an exemplary embodiment of an authentication arrangement including a workstation node, a key generator (KG) node, a certificate authority (CA), a certificate storage server (CSS) node and a revocation service (RS) node in accordance with the invention.

An illustrative embodiment of an authentication arrangement 200 of the present invention is shown in FIG. 2. The arrangement includes server nodes 202, a workstation node 210, a key generator (KG) server 218 and a certification authority (CA) 220. In general, the workstation node 210 provides an interface to a user when accessing specialized applications executing on the server nodes 202. The KG 218 is an example of a specialized server application used to register a user in the distributed system 200 by creating an account that includes the user's identity and secret (password). The KG 218 also creates a private/public key pair for aspects of the present invention described below and, thus, must operate in a trustworthy fashion. That is, the KG must choose private/public key pairs at random and must either generate or accept from the users the keys or the passwords used to encrypt or decrypt data. Further, in most implementations, the KG must reliably communicate the generated public key to certification authority 220, so that the CA (e.g., another specialized server application) may cryptographically bind the public key and the user name in a signed "certificate". Then the certificate and the private key will be returned to the directory service to be saved with user information.

In accordance with the invention, the workstation and server nodes may be configured as a distributed authentication service 201 that automates an authentication exchange between a user interface 112 200. The novel distributed service 201 comprises an exchange controller 207 coupled to an authentication database 204 containing a group of encrypted application secrets associated with the user. The controller 207, in turn, comprises an application program interface (API) that is distributed among user workstations (i.e., workstation API 214) and the authentication database (i.e., the database API 206). Illustratively, both the database API and authentication database reside in a network directory services (NDS) system.

The authentication database 204 is preferably a novel secure database containing groups of application secrets for predetermined application programs. Each group of application secrets, referred to as a "keychain", is assigned a public/private key pair by the KG 218 when the keychain is created. The database 204 also contains user objects which associate a given user with one or more keychains. The database API 206 manages the authentication database 204 in response to queries generated by workstation API 214.

Figure 3:
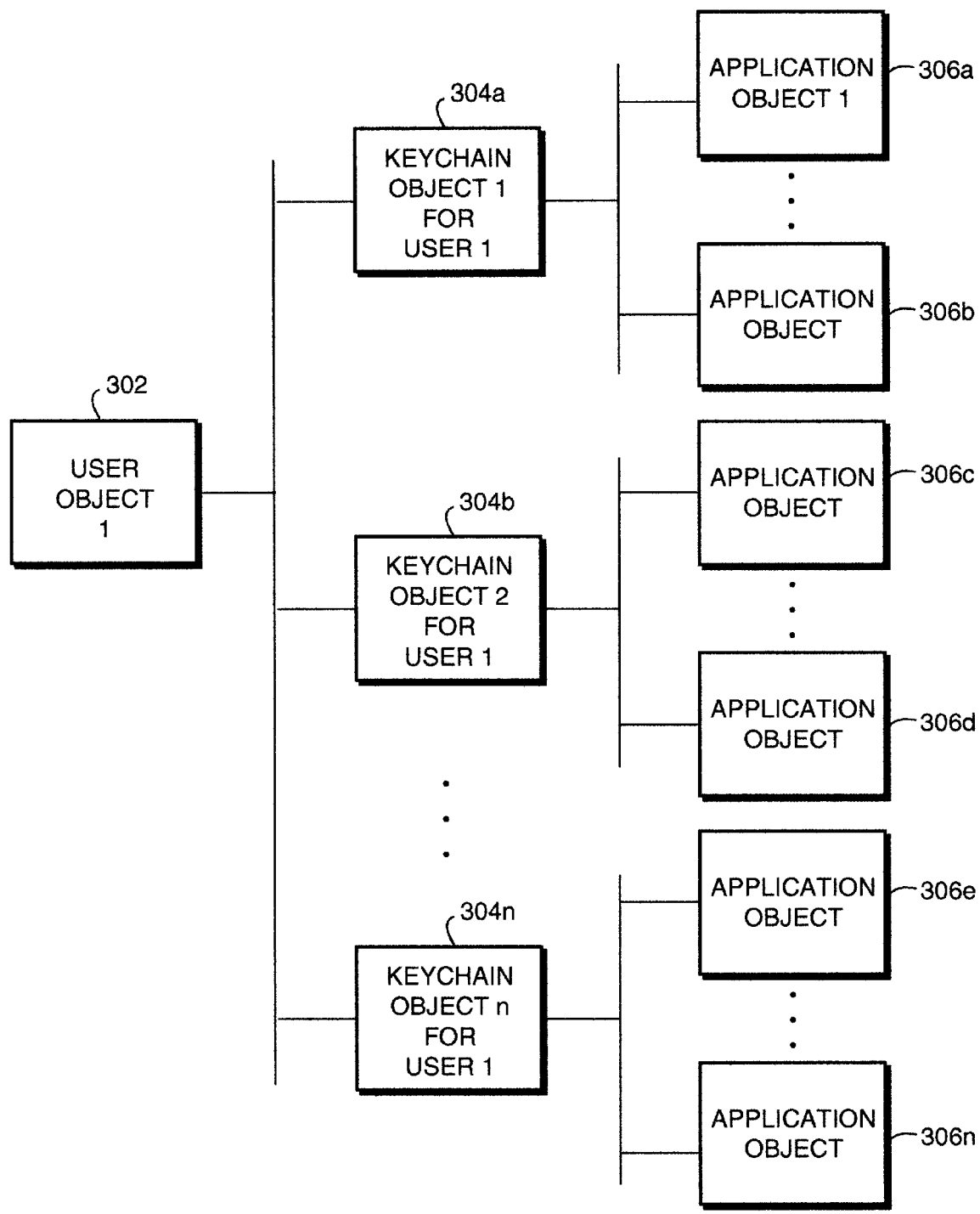
FIG. 3 is a schematized block diagram of the secure authentication database residing on network directory services.

FIG. 3 is a schematized block diagram of the authentication database 204 of the present invention. The database 204 contains three types of associated data elements configured as objects: a user object 302, one or more keychain objects 304a–n associated with user object 302, and application objects 306a–n, one or more of which is associated with each keychain object 304. Each object contains a number of attributes in accordance with the present invention as described below.

For every valid network user, the attributes of user object 302 include a login public/private key pair and a secret (e.g., the hash of the password). The user object 302 is accessed by the NDS to initially authenticate the user when the user logs on to the network. An application object 306 includes, for an associated application program, a program name, a list of users that have authority to access the program, and an application program identifier (ID). The program name attribute is a unique descriptive term that identifies the application program.

The ID is a unique character string typically supplied by the application manufacturer that identifies the application program. However, the present invention reserves a pre-assigned range of IDs for programs that have no IDs assigned to them by their manufacturer. In the preferred embodiment of the present invention, the ID is an ASN.1 (abstract syntax notation; a CCITT/ISO standard) compliant identifier defined as a "Free Form Identifier." However, as those skilled in the art would find apparent, the ID may take on other forms appropriate for the applicable network environment.

Keychain objects, or simply "keychains", are associated with one or more application objects based upon characteristics of the application programs. As noted, a keychain has as attributes at least one application secret and a public/private key pair. The application secret contains data used by the particular program to authenticate the user. Application secrets may be grouped according to, e.g., the access control level (ACL) for each application program. For example, a group of applications on one keychain may require administrative rights for modification, while another group of applications on a different keychain may allow user modifications. In the illustrative embodiment, the application secret is the user's password for that program; however, it will be understood by those skilled in the art that the secret may be any type of secure identification mechanism. The key pair encrypts/decrypts the application secrets associated with a keychain object.

As noted, in the illustrative embodiment, the exchange controller 207 comprises an API that is distributed among user workstations (i.e., workstation APIs 214) and the authentication database (i.e., the database API 206). A particular program, e.g., program 236, issues an authentication inquiry to user 112 in response to an attempt by that user to access the program's processes or data. When the authentication inquiry is received at the controller, the workstation API 214 verifies that the user is a valid network client (i.e., has successively logged-on and has been authenticated to the NDS) by requesting the proper application secret for program 236. In response to this latter request, the database API 206 accesses the authentication database 204 and provides an encrypted application secret along with the private key for decrypting the secret. The workstation API then decrypts and forwards the proper application secret (and user identity) to the particular application program.

Figure 4A:
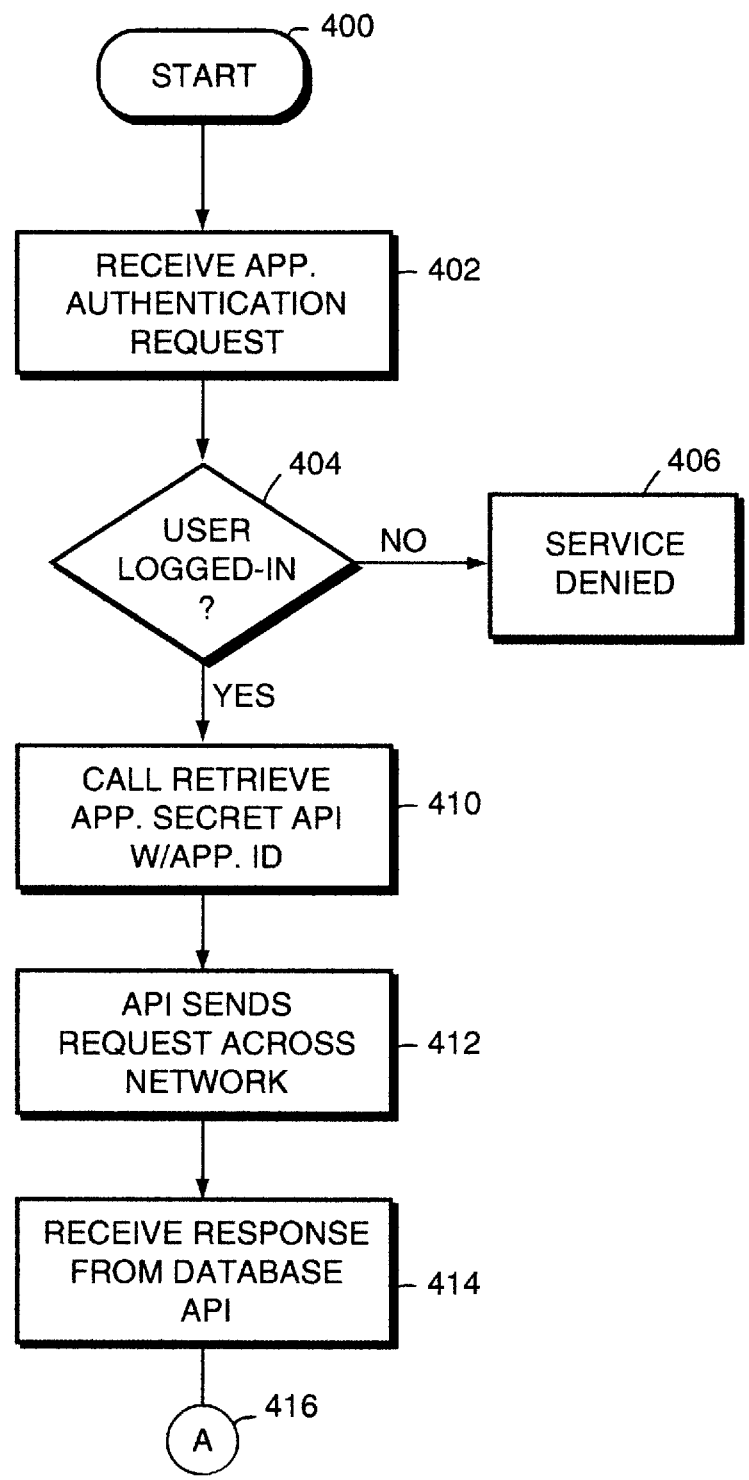
FIGS. 4A and 4B are a flowchart of the functions performed by a workstation applications program interface (API) of the present invention.
Figure 4B:
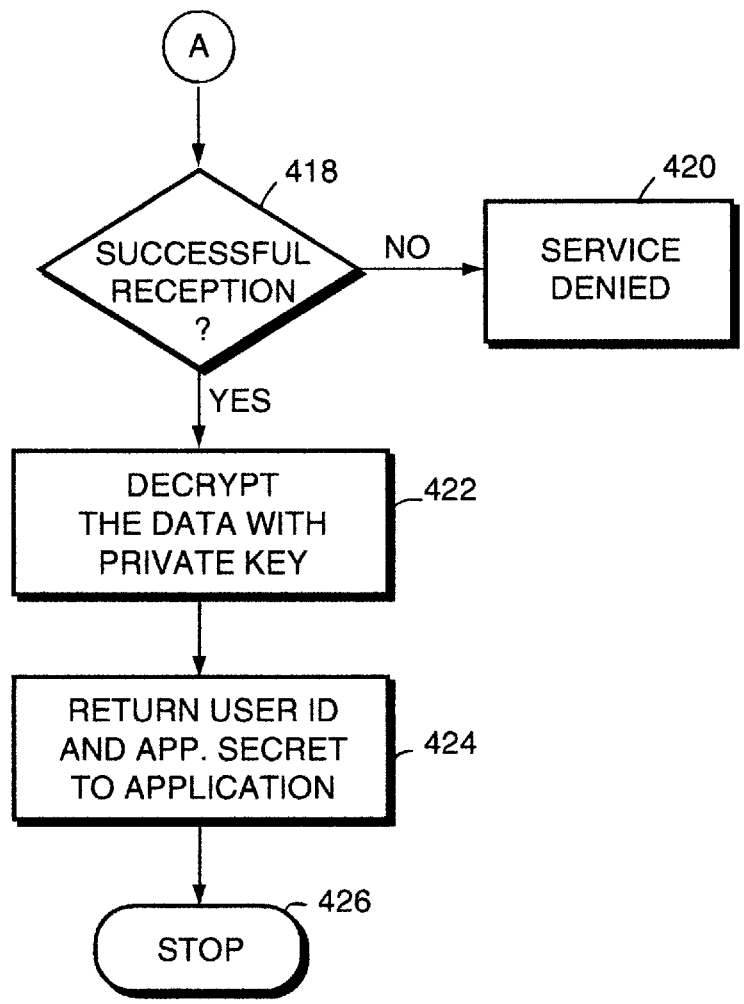

FIGS. 4A and 4B are a flow chart of the function performed by workstation API 214 in response to the authentication request generated by a particular program. As noted, when a user 201 attempts to access a particular application program, such as a local application 240 or network-based application program 236, the particular application program requires that the user be authenticated prior to accessing its processes or data. The function begins at block 400 and proceeds to block 402 where workstation API 214 receives this authentication inquiry from the application program. Upon receipt, the workstation API 214 determines whether the user is a valid network client at block 404. If the user is not a valid network client, workstation API 214 denies the user access to the distributed authentication service at block 406. However, if the user is a valid network client, then the workstation API 214 requests the proper application secret for the particular application program at block 410. For example, the workstation API 214 calls a "Retrieve Application Secret" API for retrieving the user's identity and proper application secrets. Workstation API 214 provides the application identifier of the particular application as part of the API call. The request to the database API 206 is preferably encoded in a network protocol element in a matter that is well-known in the art. The database API 206, in a matter described below with reference to FIG. 5, returns encrypted data and a keychain private key to the workstation API 214. At block 414, the workstation API 214 receives the encrypted data and keychain private key.

At block 418, the workstation API 214 determines whether it successfully received the encrypted data and a public key from the database API 206. If not, access to the distributed authentication service 201 is denied at block 420. If the information is successfully received, the workstation API 214 uses the keychain private key to decrypt the data on the workstation 210 at block 422. After decrypting the data, workstation API 214 returns the resulting user identity and application secret to the particular application program for it to perform its authentication in block 424. The function then ends at block 426.

Figure 5:
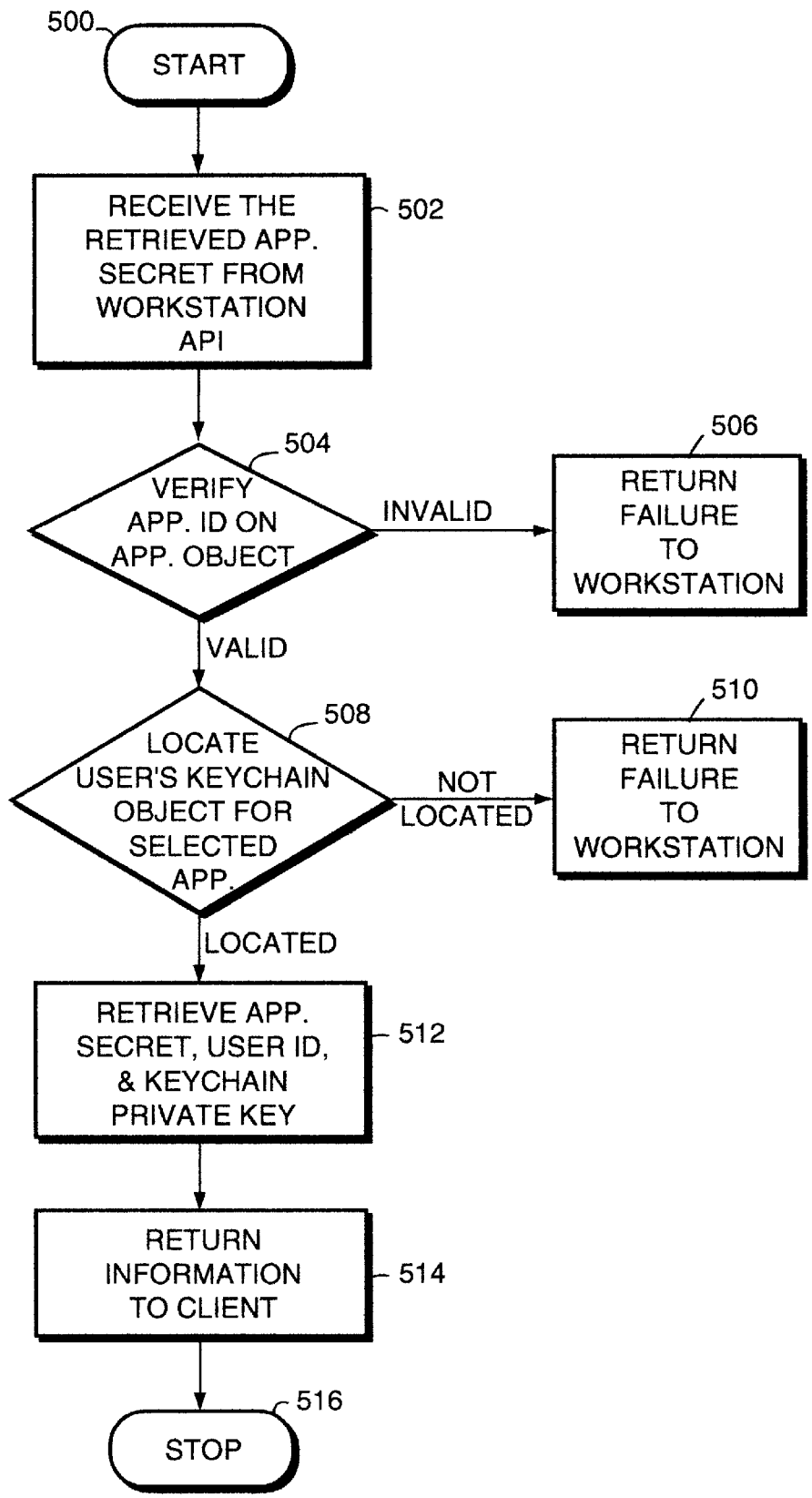
FIG. 5 is a flowchart of the functions performed by a database API of the present invention.

FIG. 5 is a flowchart of the function performed by the database API of the exchange controller in response to a workstation API's request for an application secret. The function begins at block 500 and proceeds to block 502 where the request is received at the database API 206. At block 504, the database API 206 attempts to locate the application object for the application ID received from the workstation in its request. If the application object cannot be found, the database API 206 returns a service failure indication to the workstation API 214 at block 506. If the application object is found, the database API 206 attempts to locate the user's keychain that contains the application secret for the user at block 508. If there are no keychains or if no such application secret is located in the user's keychain, a failure indication is returned to the workstation API at block 510. Otherwise, at block 512, the encrypted application secret and the keychain private key are returned to the workstation API 214.

Once the user keychain is located, the database API 206 retrieves the encrypted application secret, encrypted user identity, and keychain private key from the authentication database 204 and, at block 514, the database API 206 returns this information to the workstation API. The function then ends at block 516. As noted, at the time of installation the application secret is encrypted by using the keychain private key. Thus, the exchange controller 207 insures secure transfer of the application secret and keychain private key from the database API 206 to the workstation API 214.

The present invention supports intra-node as well as inter-node, server-to-server communications. For example, application 228 or service 230 on server 202c may attempt to access applications 236 or services 234 on server node 202b. Under such circumstances, the above process is performed by server API 216 rather than workstation API 214. As one skilled in the art would find apparent, inter-server authentication exchanges may also be performed by the distributed authentication service. Due to the internal communications of such an authentication exchange security is not an issue. Therefore, either API may decrypt the application secret.

Furthermore, the terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A distributed authentication system for automating an authentication exchange between a user and one or more application programs in a distributed network system, the system comprising:

an authentication database containing a keychain of encrypted application secrets associated with the user, each application secret associated with a particular one of the application programs, said particular application program generating an authentication inquiry requesting an application secret associated with the user and said particular application program, wherein said application secret includes said requested application secret; and an exchange controller, coupled to said authentication database, configured to perform said automated authentication exchange without user intervention by retrieving said requested application secret from said authentication database, decrypting said requested application secret, and providing said decrypted requested application secret to said particular application program in response to said authentication inquiry.

2. The system of claim 1, wherein said requested application secret is encrypted with a public key of a public/private key pair, and further wherein said exchange controller decrypts said requested application secret with a private key of said public/private key pair.

3. The system of claim 1, wherein said authentication database resides in a network directory services (NDS) portion of the distributed network system.

4. The system of claim 1, wherein said particular application program is accessible by a plurality of users, said at least one application secret stored in said authentication database including application secrets associated with each of said plurality of users and said particular application secret.

5. The system of claim 1, wherein said user accesses the distributed network system at a user interface of a workstation, and wherein said particular application program resides on said workstation.

6. The system of claim 3, wherein said distributed network system further comprises a plurality of user workstations, and wherein said exchange controller is distributed among said plurality of user workstations and said NDS.

7. The system of claim 1, wherein the network system comprises at least one workstation, said user accessing the network through a user interface at said at least one workstation, wherein said exchange controller comprises:

a workstation application program interface (API), residing on said at least one workstation, configured to perform an authentication exchange with said particular application program on behalf of the user; and a database API, responsive to said workstation API, configured to retrieve from said authentication database said requested application secret, wherein said workstation API uses said requested application secret to authenticate the user with said particular application program.

8. The system of claim 7, wherein said authentication database and said database API reside in a network directory services (NDS) portion of the distributed network system.

9. The system of claim 8, wherein one or more of said at least one application secret is associated with a keychain, each said at least one application secret associated with each said at least one keychain is encrypted with a public key of a public/private key pair, wherein said encrypted requested application is provided to said workstation API.

10. The system of claim 9, wherein said workstation API is configured to decrypt said encrypted application secret and to provide said decrypted application secret to said particular application program.

11. A distributed authentication service for efficiently authenticating users at any of a plurality of workstations with one or more application programs residing on server nodes of a distributed network system, the service comprising:

an authentication database, residing in a network directory service (NDS) of the network system, comprising one or more keychains accessible by one or more of said users, each keychain comprising at least one encrypted application secret, each application secret associated with each accessible user and with one of the application programs, and further wherein each application secret contained within each keychain is encrypted with a public key of a public/private key pair assigned to each keychain, a workstation application program interface (API), residing on the plurality of workstations, configured to perform an authentication exchange on behalf of, and without intervention of, a user with a particular one of the application programs; and a database API, residing on said NDS and responsive to said workstation API, configured to retrieve from said authentication database an application secret associated with the user, said retrieved application secret authenticating the user with said particular application program, wherein said workstation API decrypts said encrypted application secret and provides said decrypted application secret to said particular application program.

12. The system of claim 11, wherein the distributed network system further comprises a network directory service (NDS), and wherein said authentication database and said database API reside in said NDS.

13. The system of claim 11, wherein said workstation API denies said user access to said particular program when said user is not a valid network client.

14. A method for automating an authentication exchange between a user at a user workstation and an application program of a distributed network system by an authentication service, the method comprising the steps of:

(a) receiving at an exchange controller an authentication inquiry generated by the application program;

(b) receiving, without user intervention, an encrypted application secret associated with the user and said application program from a keychain of encrypted application secrets associated with the user, each application secret in said keychain being associated with at least one particular application program, said keychain being stored in a distributed authentication database coupled to said exchange controller; and (c) decrypting said encrypted associated application secret retrieved from the keychain and providing the application program with said decrypted associated application secret retrieved from the keychain.

15. The method of claim 14, further comprising the steps of:

(d) prior to said step (b), verifying that the user is a valid network client; and (e) denying said user access to the authentication service when said user is not a valid network client.

16. The method of claim 14, wherein:

said encrypted application secret associated with said user and said application program is encrypted with a public key of a public key/private key stored in said authentication database.

17. The method of claim 14, wherein said exchange controller comprises a workstation application program interface (API) residing on the user workstation, and a database API residing in a network directory service with said authentication data-base, said workstation API receiving said authentication inquiry from the application program, wherein said steps (b) and (c) together comprise the steps of:

(1) transferring a request for said encrypted application secret associated with said user and said application program from said workstation API to said database API;

(2) retrieving from said authentication database, by said database API, said encrypted application secret associated with said user and said application program;

(3) transferring from said database API to said workstation API, said encrypted application secret associated with said user and said application program;

(4) denying access to the distributed authentication service by said workstation API when said encrypted application secret associated with said user and said application program is not received; and (5) decrypting said encrypted application secret associated with the user and the application program and returning said decrypted associated application secret to the application program by said workstation API when said encrypted application secret associated with said user and said application program is received.

18. The method of claim 17, wherein said encrypted application secret stored in said authentication database is encrypted with a public key of a public/private key stored in said authentication database, and wherein said method also comprises the steps of:

(6) after said step (1), retrieving from said authentication database, by said database API, a private key of said public/private key;

(7) after said step (1), transferring said private key from said database API to said workstation API;

(8) decrypting, at said workstation API, said encrypted application secret with said private key; and (9) forwarding said decrypted application secret to said particular application program.

19. The system of claim 14, wherein said user accesses the distributed network system at a user interface of a workstation, and wherein said application program resides on said workstation.

20. The system of claim 19, wherein said authentication database resides in a network directory services (NDS) portion of the distributed network system.

* * * * *

UNITED STATES PATENT AND TRADEMARK OFFICE
CERTIFICATE OF CORRECTION

PATENT NO. : 5,818,936
DATED : October 6, 1998
INVENTOR(S) : Cameron Mashayekhi

It is certified that error appears in the above-identified patent and that said Letters Patent is hereby corrected as shown below:

On the title page, item [54] and column 1, line 2, change "AUTOMICALLY" to --AUTOMATICALLY--.

Signed and Sealed this

Nineteenth Day of January, 1999

Attest:

*Attesting Officer*

*Acting Commissioner of Patents and Trademarks*

UNITED STATES PATENT AND TRADEMARK OFFICE
Certificate

Patent No. 5,818,936            Patented: October 6, 1998

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Cameron Mashayekhi; Douglas Lavell Hale; and Roger R. Schnell.

Signed and Sealed this Twenty-First Day of March, 2000.

THOMAS H. TARCZA
Supervisory Patent Examiner,
Art Unit 3662